US007194594B2

(12) United States Patent
Asami et al.

(10) Patent No.: US 7,194,594 B2
(45) Date of Patent: Mar. 20, 2007

(54) STORAGE AREA MANAGEMENT METHOD AND SYSTEM FOR ASSIGNING PHYSICAL STORAGE AREAS TO MULTIPLE APPLICATION PROGRAMS

(75) Inventors: Masato Asami, Tokyo (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 10/875,426

(22) Filed: Jun. 23, 2004

(65) Prior Publication Data

US 2005/0278584 A1 Dec. 15, 2005

(30) Foreign Application Priority Data

May 25, 2004 (JP) .............................. 2004-154221

(51) Int. Cl.
G06F 12/00 (2006.01)
(52) U.S. Cl. ..................................... 711/170
(58) Field of Classification Search ...................... None
See application file for complete search history.

(56) References Cited

U.S. PATENT DOCUMENTS

| 5,790,886 | A | 8/1998 | Allen |
| 6,321,317 | B1 | 11/2001 | Borowsky et al. |
| 6,446,161 | B1 | 9/2002 | Yamamoto et al. |
| 6,633,954 | B1 * | 10/2003 | Don et al. .................. 711/114 |
| 6,829,678 | B1 | 12/2004 | Sawdon et al. |
| 6,839,804 | B2 | 1/2005 | Don et al. |
| 2002/0099908 | A1 | 7/2002 | Yamamoto et al. |
| 2004/0003077 | A1 | 1/2004 | Bantz et al. |
| 2004/0148485 | A1 * | 7/2004 | Suzuki ....................... 711/170 |
| 2004/0243692 | A1 | 12/2004 | Arnold et al. |
| 2005/0160428 | A1 * | 7/2005 | Ayachitula et al. ......... 718/104 |

* cited by examiner

*Primary Examiner*—Hyung Sough
*Assistant Examiner*—Craig E Walter
(74) *Attorney, Agent, or Firm*—Townsend and Townsend and Crew LLP

(57) ABSTRACT

Provided are an area management table, an operation management policy, and a resource broker. In the area management table, one or more physical area IDs for identifying one or more storage area candidates selected from a plurality of physical storage areas, are associated with each application program. The operation management policy states a guideline for storage area assignments based on operational status of each server provided with the application programs. The resource broker detects the operational status of each server, and based on the detected operational statuses and the operation management policy, determines physical storage areas to assign to each application program.

11 Claims, 13 Drawing Sheets

FIG. 2

| PHYSICAL AREA INFORMATION | | ACCESS PATHNAME | AP INFORMATION |
|---|---|---|---|
| PHYSICAL ID | DEVICE ID | | |
| P1 | V1 | ......... | AP1 |
| P2 | V1 | ......... | — |
| P3 | V2 | ......... | |
| ......... | ......... | ......... | ......... |

4

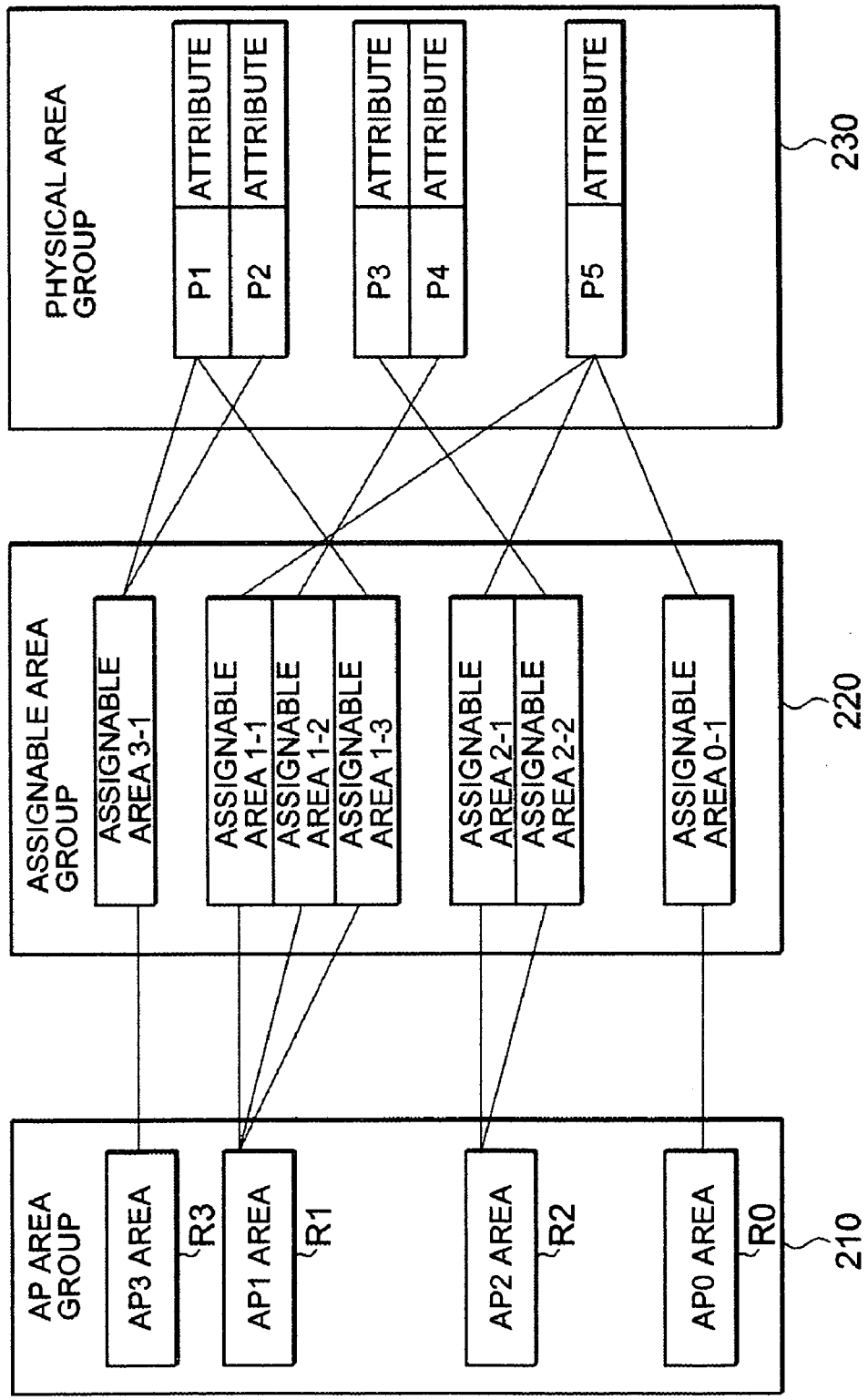

FIG. 3B

| IDENTIFIER | AP AREA INFORMATION | INDEX (PRIORITY RANK) | ACTUAL ALLOCATION | PHYSICAL AREA INFORMATION | |
|---|---|---|---|---|---|
| 01 | AP1 | 1 | | P5 | ...... |
| 02 | AP1 | 3 | | P4 | ...... |
| 03 | AP1 | 2 | ○ | P1 | ...... |
| 04 | AP2 | 1 | | P5 | ...... |
| 05 | AP2 | 2 | ○ | P3 | ...... |
| 06 | AP3 | 1 | | P1 | ...... |
| | | | | P2 | ...... |
| 07 | AP0 | 1 | ○ | P5 | ...... |

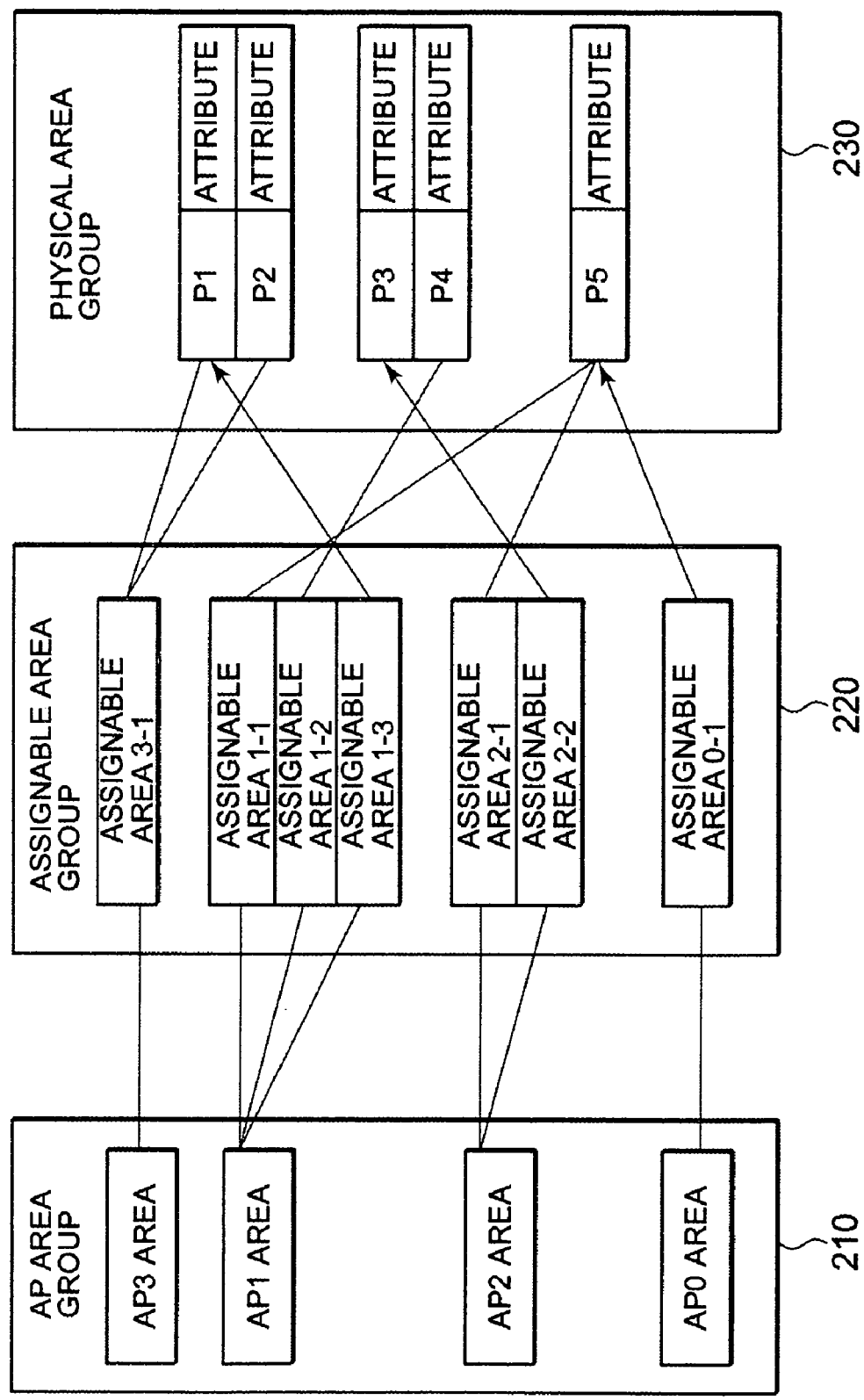

FIG. 6A

| IDENTIFIER | AP AREA INFORMATION | INDEX (PRIORITY RANK) | ACTUAL ALLOCATION | PHYSICAL AREA INFORMATION | |
|---|---|---|---|---|---|
| 01 | AP1 | 1 |  | P5 | ... |
| 02 | AP1 | 3 |  | P4 | ... |
| 03 | AP1 | 2 | ○ | P1 | ... |
| 04 | AP2 | 1 |  | P5 | ... |
| 05 | AP2 | 2 | ○ | P3 | ... |
| 06 | AP3 | 1 |  | P1 | ... |
|  |  |  |  | P2 |  |
| 07 | AP0 | 1 | ○ | P5 | ... |

| IDENTIFIER | AP AREA INFORMATION | INDEX (PRIORITY RANK) | ACTUAL ALLOCATION | PHYSICAL AREA INFORMATION | |
|---|---|---|---|---|---|
| 01 | AP1 | 1 |   | P5 | ... |
| 02 | AP1 | 3 | ○ | P4 | ... |
| 03 | AP1 | 2 |   | P1 | ... |
| 04 | AP2 | 1 |   | P5 | ... |
| 05 | AP2 | 2 | ○ | P3 | ... |
| 06 | AP3 | 1 | ○ | P1 | ... |
| 07 | AP0 | 1 | ○ | P5 | ... |

Additional entry: P2 (under row 06)

201

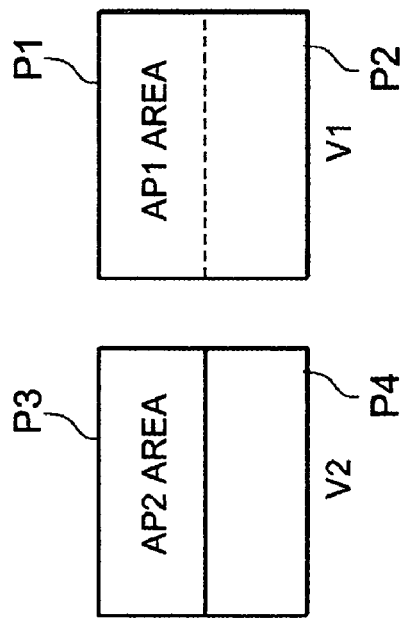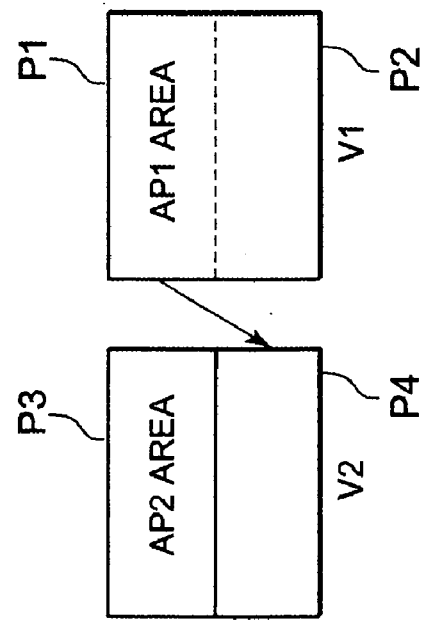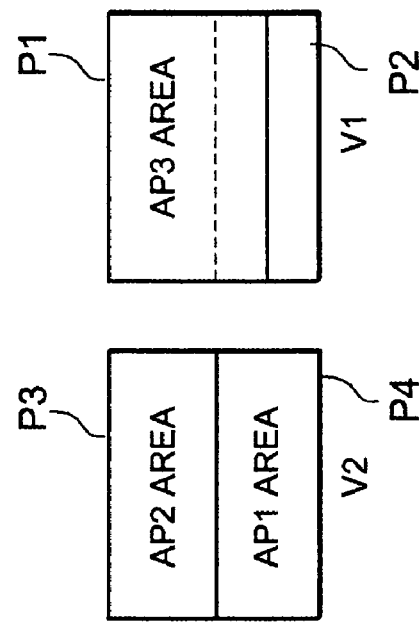

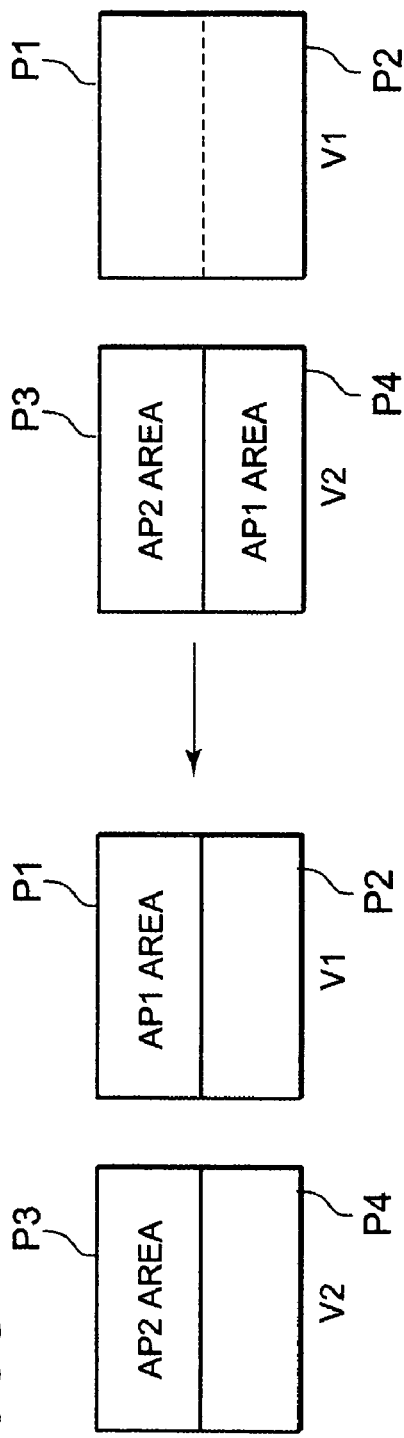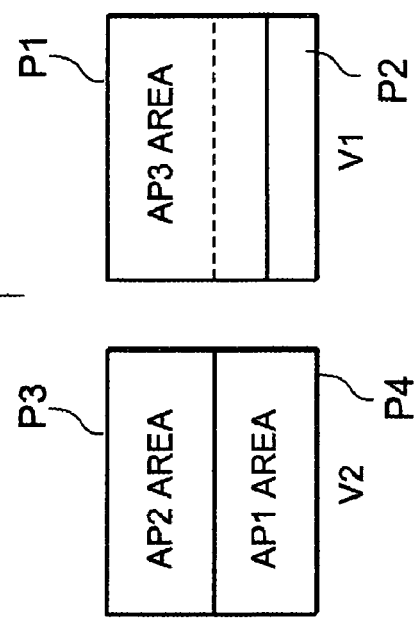

STORAGE AREA MANAGEMENT METHOD AND SYSTEM FOR ASSIGNING PHYSICAL STORAGE AREAS TO MULTIPLE APPLICATION PROGRAMS

CROSS-REFERENCE TO RELATED APPLICATIONS

This application program relates to and claims priority from Japanese Patent Application program No. 2004-154221, filed on May 25, 2004, the entire disclosure of which is incorporated herein by reference.

BACKGROUND OF THE INVENTION

1. Field of the Invention

The present invention relates to a technique for managing a plurality of storage areas.

2. Description of the Related Art

For example, JP 2004-38972A, Official Gazette (Patent Document 1) discloses a technique for assigning a grid workload based the operation status of a plurality of workstations.

Furthermore, for example, U.S. Pat. No. 6,446,161 (Patent Document 2) discloses a technique for updating allocation of a logical disk to a physical disk, based on logical disk access information.

Incidentally, conventionally there have been computer systems provided with a storage system having a plurality of storage areas, and a plurality of computers using the storage areas as one resource. Sometimes, each of the plurality of computers operates within the same timeframe that the other computers operate, dynamically being added and deleted to/from the computer system. In response to the status of the plurality of computers, the storage areas used by each computer are preferably modified.

SUMMARY OF THE INVENTION

Therefore, an object of the present invention is to appropriately modify storage areas assigned to each of a plurality of computers, according to the status of the computers.

Further objects of the present invention should become clear from the following explanations.

A storage area management system according to the present invention is provided to a computer system having a plurality of storage areas (e.g., physical storage areas on a hard disk or other such storage disk) and a plurality of application programs using one or more of the storage areas as a resource. The storage area management system further comprises a data obtaining unit, a policy data obtaining unit, an operational status detecting unit, an area assignment determining unit, and an information outputting unit. The data obtaining unit obtains area management data, in which one or more storage area IDs identifying one or more storage area candidates among the plurality of storage areas is associated with each application program. The policy data obtaining unit obtains selection policy data stating a guideline for storage area assignments based on operational status of the application programs. The operational status detecting unit detects operational status of each of the plurality of application programs. The area assignment determining unit, based on the operational status and the obtained selection policy data to refer the obtained area management data, and searches through the one or more storage area IDs associated with each application program to extract the storage area ID of the storage area to assign to each application program. The assignment information output unit outputs assignment information about which application program to assign which storage area, based on the storage area ID extracted for each application program.

Note that the "application program" may be application program software installed on a server or other computer machine, or may virtual computers temporarily built on the machines.

According to a first embodiment of a system according to the present invention, in the area management data one or a plurality of assignable areas are prepared for each application program. Each assignable area of each application program is associated with one or a plurality of storage area IDs, and an index indicating a level selected from a plurality of levels. In the selection policy data are recorded a plurality of index levels associated with a plurality of operational statuses of the application programs. The area assignment determining unit, for each application program, extracts from the obtained selection policy data the index associated with the detected operational status, references the area management data, searches for an assignable area associated with the extracted index and the application program, and extracts a storage area ID from the one or plurality of storage area IDs associated with the retrieved assignable area.

According to a second embodiment of the system according to the present invention, in the above-mentioned first embodiment, the computer system is provided with one or more storage systems having a plurality of physical or logical storage devices. The storage area is one or a plurality of storage areas provided inside the storage device. The one or more storage devices are provided with a first storage device having a first storage area, and a second storage device having a second and a third storage area. The plurality of application programs include a first and a second application program. The area management data records currently-assigned area information for identifying assignable areas which are currently assigned to the first and second application programs respectively. The area management data has a first and a second assignable area associated with the first application program, and a third assignable area associated with the second application program. The first assignable area is associated with a first storage area ID which is a storage area ID of the first storage area, and a first index. The second assignable area is associated with a second storage area ID which is a storage area ID of the second storage area, and a second index at a lower level than the first index. The third assignable area is associated with the first storage area ID and a third index at a higher level than the first index. The area assignment determining unit detects, based on the currently-assigned area information associated with the first application program, that the first assignable area is currently assigned. Furthermore, the area assignment determining unit detects that the third index of the third assignable area associated with the second application program indicates a higher-level than the first index of the first assignable area which is currently assigned. Furthermore, the area assignment determining unit modifies the assignable area currently assigned to the first application program from the first assignable area to the second assignable area based on the selection policy data. Furthermore, the area assignment determining unit extracts the first storage area ID associated with third assignable area from the area management data as a storage area ID to be assigned to the second application program. Furthermore, the area assignment determining unit updates the currently-assigned area information for the second application program to information indicating that the third assignable area is currently assigned.

According to a third embodiment of the system according to the present invention, in the above-mentioned second embodiment, the area assignment determining unit updates the currently-assigned area information for the second application program to information indicating that the third assignable area is not currently assigned. Furthermore, the area assignment determining unit retrieves, from the area management data, the first assignable area associated with the first storage area ID associated with third assignable area. Furthermore, the area assignment determining unit updates the currently-assigned area information for the first application program to information to indicate that the retrieved first assignable area is currently assigned. The above-mentioned information output unit may also output assignment information indicating that the area used by the first application program is to be modified from the first storage area to the second storage area, and that the first storage area is to be assigned as the area to be used by the second application program.

According to a fourth embodiment of the system according to the present invention, the area assignment determining unit extracts a storage area ID for each application program such that the storage areas assigned to each application program become the same as at a previous point in time.

A storage area management method according to the present invention is realized on a computer system having a plurality of storage areas and a plurality of application programs using one or more of the storage areas as a resource. The storage area management method comprising a data obtaining step, a policy data obtaining step, an operations detection step, an area assignment determining step, an information outputting step, and an area assigning step. The data obtaining step obtains area management data in which one or more storage area IDs for identifying one or more storage area candidates among the plurality of storage areas is associated with each application program. The policy data obtaining step obtains selection policy data stating a guideline for storage area assignments based on operational status of the application programs. The operational status detecting step detects operational status of each of the plurality of application programs. The area assignment determining step uses the detected operational status and the obtained selection policy data to refer the obtained area management data, and searches through the one or more storage area IDs associated with each application program to extract the storage area ID of a storage area to be assigned to each application program. The assignment information outputting step outputs assignment information about which application program to assign which storage area, based on the storage area ID extracted for each application program. The area assigning step inputs the outputted assignment information, and assigns the storage areas to each application program based on the assignment information.

BRIEF DESCRIPTION OF THE DRAWINGS

FIG. 2 shows a configuration example of a disk management table 4;

FIG. 3A shows a concept of an area management table 201, and FIG. 3B shows a configuration example of the area management table 201;

FIG. 5A shows a concept of the area management table 201 before starting the processing flow shown in FIG. 4.

FIG. 6A shows a construction of the area management table 201 before starting the processing flow shown in FIG. 4, and FIG. 6B shows a construction of the area management table 201 after starting the processing flow shown in FIG. 4;

FIG. 7A, FIG. 7B, and FIG. 7C show modification of actual allocation of physical storage areas to each AP area by means of the processing flow shown in FIG. 4.

FIG. 9 shows modification of actual allocation of physical storage areas to each AP area by means of the processing flow shown in FIG. 8.

DETAILED DESCRIPTION OF THE PREFERRED EMBODIMENTS

Hereinafter, referencing the diagrams, explanation is given regarding an embodiment of the present invention.

Figure 1:
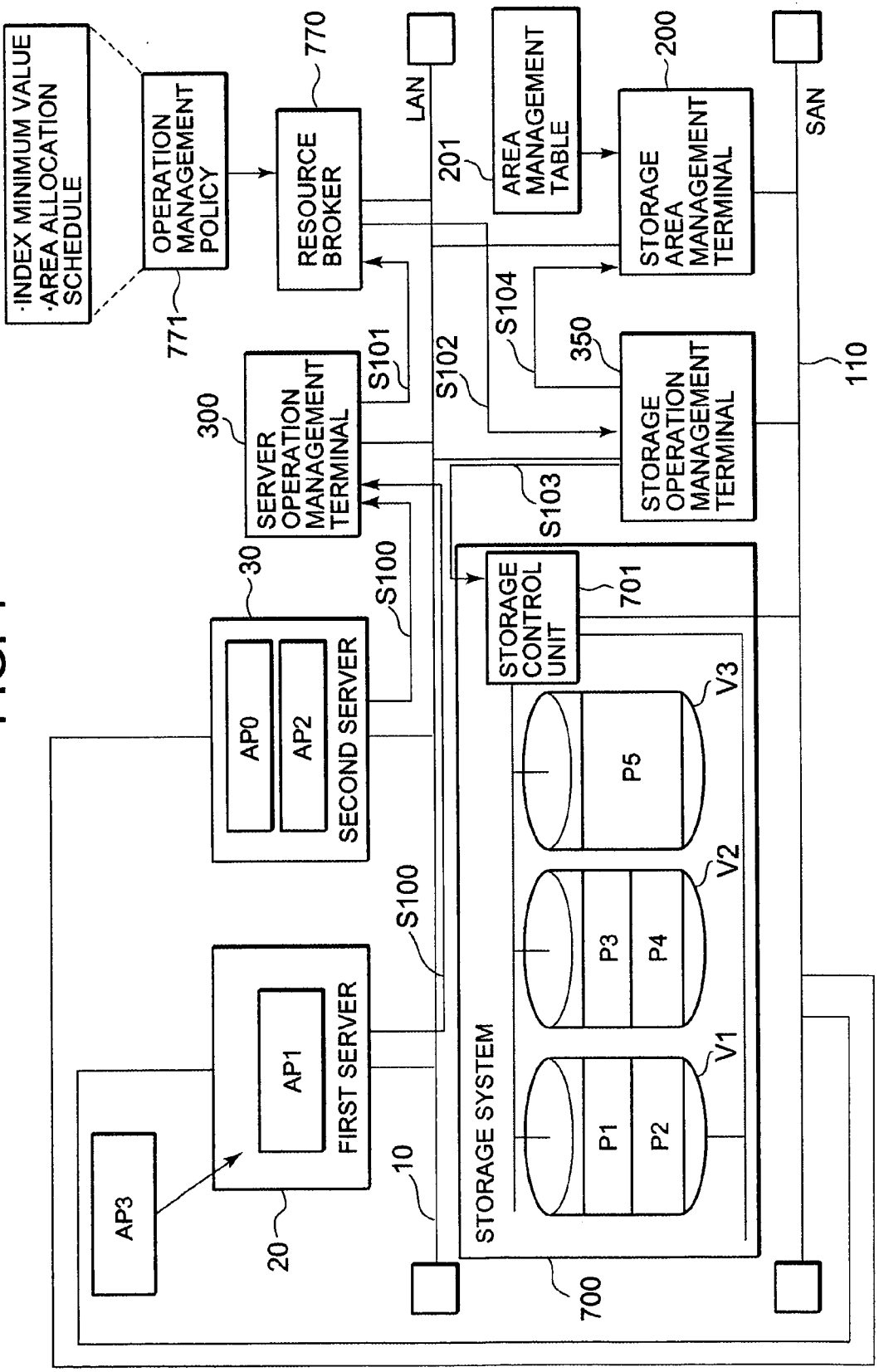
FIG. 1 shows an overall construction of a storage area management system according to an embodiment of the present invention.

FIG. 1 shows an overall construction of a storage area management system according to an embodiment of the present invention.

Connected to both a first network of a LAN (Local Area Network) 10 or the like, and a second network of a SAN (Storage Area Network) 110 or the like, are, for example, a first server 20, a second server 30, a storage operation management terminal 300, a storage system 700, a storage operation management terminal 350, a storage area management terminal 200, and a resource broker 770. Since these devices 20, 30, 300, 700, 350, 200 and 770 may use known computer machine hardware constructions (e.g., constructions having a CPU, a memory, a hard disk drive, etc.), diagram explanations of the hardware constructions are omitted.

The first server 20 and the second server 30 each run one or a plurality of application program software programs (hereinafter, simply called "application programs"). Hereinafter, for ease of explanation, the application programs that can run on the first server 20 are application programs AP1 and AP3, and the application programs that can run on the second server 30 are application programs AP0 and AP2.

The storage operation management terminal 300 learns, and stores, the operational status of the first server 20 and the second server 30, and notifies the operational status to the resource broker 770. Note that the "operational status" of the server refers, for example, to at least one of (1) and (2) below:

(1) What kind of server attributes the server has, and what kind of application program attributes the application programs running on the server have;

(2) What application programs are run on the server, or what the status of the load on the server itself is.

Note that the server attributes may be, for example, the name of the server and information about the server's resources (e.g., the type of OS on the server, the capacity of the memory, etc.). Furthermore, the application program attributes may be, for example, the application program's name, manufacturer, and information about its operating environment (e.g., how much memory capacity is required, etc.). These server attributes and application program attributes may be stored by the storage operation management terminal 3000, in association with server or application program IDs. The server ID, or the ID of the application program that was run, may be received from the first server 20 or the second server 30. From the received ID, the attributes of the associated server or the attributes of the associated application program can be learned.

The storage system 700 is, for example, RAID (Redundant Array of Independent Disks) system provided with a plurality of physical disks arranged in an array pattern. Hereinafter, for sake of convenience, the plurality of physical disks are, for example, three physical disks V1 through V3. Each of the physical disks V1 through V3 is provided with one or a plurality of physical storage areas (e.g., areas obtained by logically dividing storage area on one physical disk). Specifically, for example, the physical disk V1 is provided with physical storage areas P1, P2; the physical disk V2 is provided with physical storage areas P3 and P4; and physical disk V3 is provided with a physical storage area P5.

The storage system 700 is provided with a storage control unit 701 that controls access to each of the physical storage areas P1 through P5 via the LAN 10 or the SAN 110 from a device external to the storage system 700. The hardware construction of the storage control unit 701 can use, for example, a construction provided with a CPU controlling overall operations of the storage system 700, a cache memory that temporarily stores data exchanged between the physical storage areas P1 through P5 and the external device, a disk management table for managing associations between the physical storage areas P1 through P5 and the physical disks V1 through V3, or the like. The disk management table 4 can have, for example, a storage unit (e.g., a memory), which is not depicted in the diagram, in the storage control unit 701. Registered in the disk management table 4 are, for example, as shown in FIG. 2, for each of the plurality of physical storage areas P1 through P5, a physical ID which is an ID of the physical storage area, a disk ID which is an ID of the physical disk having the physical storage area, an access path name which is a pathname for accessing the physical storage area from the storage system 700, and an application program ID which is an ID of the application program to which the physical storage area has actually been assigned. The content of this disk management table 4 can be updated, for example, by the storage control unit 701, based on a notification from the storage operation management terminal 350 or the storage area management terminal 200.

The storage operation management terminal 350 can control operations of the storage system 700.

The storage area management terminal 200 is provided with an area management table 201 for managing such things as which application program AP0 through AP3 the physical storage areas P1 through P5 in the storage system 700 have been assigned to, and the like. The area management table 201, for example, as shown in the diagram, can be inputted from outside the storage area management terminal 200.

FIG. 3A shows a concept of the area management table 201, and FIG. 3B shows a configuration example of the area management table 201.

As shown in FIG. 3A, the area management table 201 conceptually manages an AP area group 210, an assignable area group 220, and a physical area group 230.

The AP area group 210 includes a plurality of AP areas R0 through R3 used by the plurality of application programs AP0 through AP3, respectively. Here, the "AP area" refers to the storage area used by the application program associated therewith.

The assignable area group 220 includes one or a plurality of assignable areas associated with each of the plurality of AP areas R0 through R3. Here, "assignable area" refers to an area (e.g., a pointer) for associating one AP area with one or a plurality of physical storage areas P1 through P5 that can be assigned to that AP area. One or a plurality of physical storage areas can be associated with one assignable area. Several representative examples are given as explanation as follows. Associated with the AP3 area R3 is one assignable area 3-1, and associated with that assignable area 3-1 are two physical storage areas P1, P2. Furthermore, associated with the AP1 area R1 are three assignable areas 1-1 through 1-3. Associated with the assignable area 1-1 is one physical storage area P3, associated with the assignable area 1-2 is one physical storage area P4. And associated with the assignable area 1-3 is one physical storage area P1. That is, as understood from this explanation, a plurality of physical storage areas can be associated with one assignable area, and a plurality of assignable areas can be associated with one physical storage area.

The physical area group 230 includes a plurality of physical storage areas P1 through P5 prepared on the plurality of physical disks V1 through V3. Note that, this group 230 may also include attributes of each of the physical storage areas P1 through P5. Attributes of the physical storage areas can be, for example, IDs, reliability, performance (e.g., writing or reading speed per unit data size, etc.) of the physical disk provided with the physical storage area.

According to the explanation of FIG. 3A, each of the application programs AP0 through AP3 require storage area. One or more physical storage area candidates, which can actually be assigned to the storage area, are selected before hand from the plurality of physical storage areas P1 through P5. According to the example in FIG. 3A, for example, P5 and P3 are provided as the one or more physical storage area candidates which can actually be assigned as the storage area used by the application program AP2.

FIG. 3B shows an example of the area management table 201 constructed based on the foregoing concept. That is, registered in the area management table 201 are the following for each of the plurality of application programs AP0 through AP3: AP area information, one or a plurality of identifiers, an index associated with each of the one or plurality of identifiers, one or a plurality sets of physical area information associated with each of the one or plurality of identifiers, and actual allocation information.

The AP area information is attribute information relating to the application program associated therewith. For example, the ID of the application program (e.g., any of AP0 through AP3) is registered here.

The one or plurality of identifiers are information for identifying one or more assignable areas that have been assigned to application program associated with the identifier.

The "index" refers to a guideline regarding which of the one or plurality of assignable areas (i.e., which identifier) associated with the associated AP area to select. For example, the index may indicate a priority rank. The index has a plurality of levels (e.g., "1" to "3") The index is set, for example, based on the attributes of the one or plurality of physical storage areas associated with the assignable area associated with that index. More specifically, for example, a high-level index (index with a low number) is set for a physical storage area on a high-reliability high-performance physical disk. On the other hand, a low-level index is set for a physical storage area on a low-reliability low-performance physical disk. For example, the index may be written in a way that can be recognized as a sequence (e.g., "low"/"high", or numbers, etc.) by a computer referencing the area management table 201. The index level set for each area assignable to each of the AP areas can be set based on various other standards.

The physical storage area can included, for example, IDs (e.g., P5, P4, etc.) for identifying the physical storage areas associated with the IDs, and the capacity of the physical storage area, and also various attributes relating to the physical storage area.

The actual allocation information is information indicating whether or not the associated assignable area (i.e., identifier) has actually been selected and assigned to the application program (i.e., whether or not it has been assigned). The storage area management terminal 200 assigns the physical storage area associated with the assignable area, to the application program associated with the assignable area, and then modifies the actual allocation information for that assignable area to positive content. After that, the storage area management terminal 200 then performs exclusion processing, so that the physical storage area associated with the assignable area that is set with the positive actual allocation information does not get assigned to another application program.

According to the area management table 201, the indices assigned to the same physical storage area can be different for each AP area (i.e., each application program). For example, looking at the physical storage area P1, for application program AP1 the index of the physical storage area P1 is "2", but for the other application program AP3 the index of the physical storage area P1 is "1", which is different from application program AP1. In this way, according to the area management table 201, the indices assigned to the same physical storage area can be different for each application program.

Now, FIG. 1 is referenced again.

The resource broker 770 is an information processing terminal for linking the operational status of the servers 20, 30 with the assignment of the physical storage areas P1 through P5 in the storage system 700 to the application programs AP0 through AP3. The resource broker 770 can store, for example, an operation management policy 771 which is inputted from an external area as shown in the diagram. The operation management policy 771 is data that stores which application program AP0 through AP3 to assign the assignable area of which index, based on the operational status of the servers. Specifically, for example, the following content may be recorded:

(1) Index Minimum Value

An "index minimum value" refers to a minimum value of the index of the assignable area (or physical storage area) that will actually be assigned to the application program. For example, the minimum index value may be set separately for each application program. Specifically, for example, in a case where the application program AP1 has an index minimum value of "2", even if the indices of the assignable areas associated with the application program AP1 are "1" through "5", the assignable areas associated with the indices "3" through "5" cannot actually assigned.

(2) Area Allocation Schedule

An "area allocation schedule" refers to a schedule showing which index's assignable area will be assigned to which application program during which time block. This may also be set separately for each AP area, for example.

In addition, various other information can also be registered in an operation management policy 771. For example, information such as the priority ranks of the application programs can also be registered. Here, as an example, when the priority ranks of the application programs are sequenced as AP3, AP0 and then AP1, if the application program AP3 is run then, then, according the area management table 201 in FIG. 6A and FIG. 6B described below, the physical storage areas P1, P2 having the indices of "1" will be assigned to the application program AP3. Then, the application program AP1 should be assigned the physical storage area P5 with the index "1", but the physical storage area P5 has already been assigned for the application program AP0 which the higher propriety rank than the application program AP1. Therefore, the application program AP1 is assigned the physical storage area P4 with the lowest index of the application program AP1.

The foregoing was an outline of a construction of the storage area management system according to the present embodiment. Hereinafter, FIG. 1 is referenced to explain one outline of processing flow performed based on this construction.

The server operation management terminal 300 learns the operational status of the servers 20, 30 (step S100), and notifies the operational status that was learned to the resource broker 770 (S101).

The resource broker 770, based on the notified operational status, the stored operation management policy 771 and the area management table 201 provided to the storage area management terminal 200, determines how to modify the allocation of the physical storage areas with respect to each of the application programs, and sends the actual allocation information showing the post-modification actual allocation, and a request to modify the actual allocation as shown in the actual allocation information, to the storage operation management terminal 350 (step S102).

The storage operation management terminal 350, responding to the request from the resource broker 770, accesses the storage system 700, and, according to the actual allocation information received from the resource broker 770, modifies the actual allocation of the physical storage areas P1 through P5 with respect to the application programs (S103), and notifies the actual allocation status showing how the actual allocation was modified to the storage area management terminal 200 (S104). The storage area management terminal 200 updates the content of the area management table 201, based on the actual allocation status from the storage operation management terminal 200.

Figure 4:
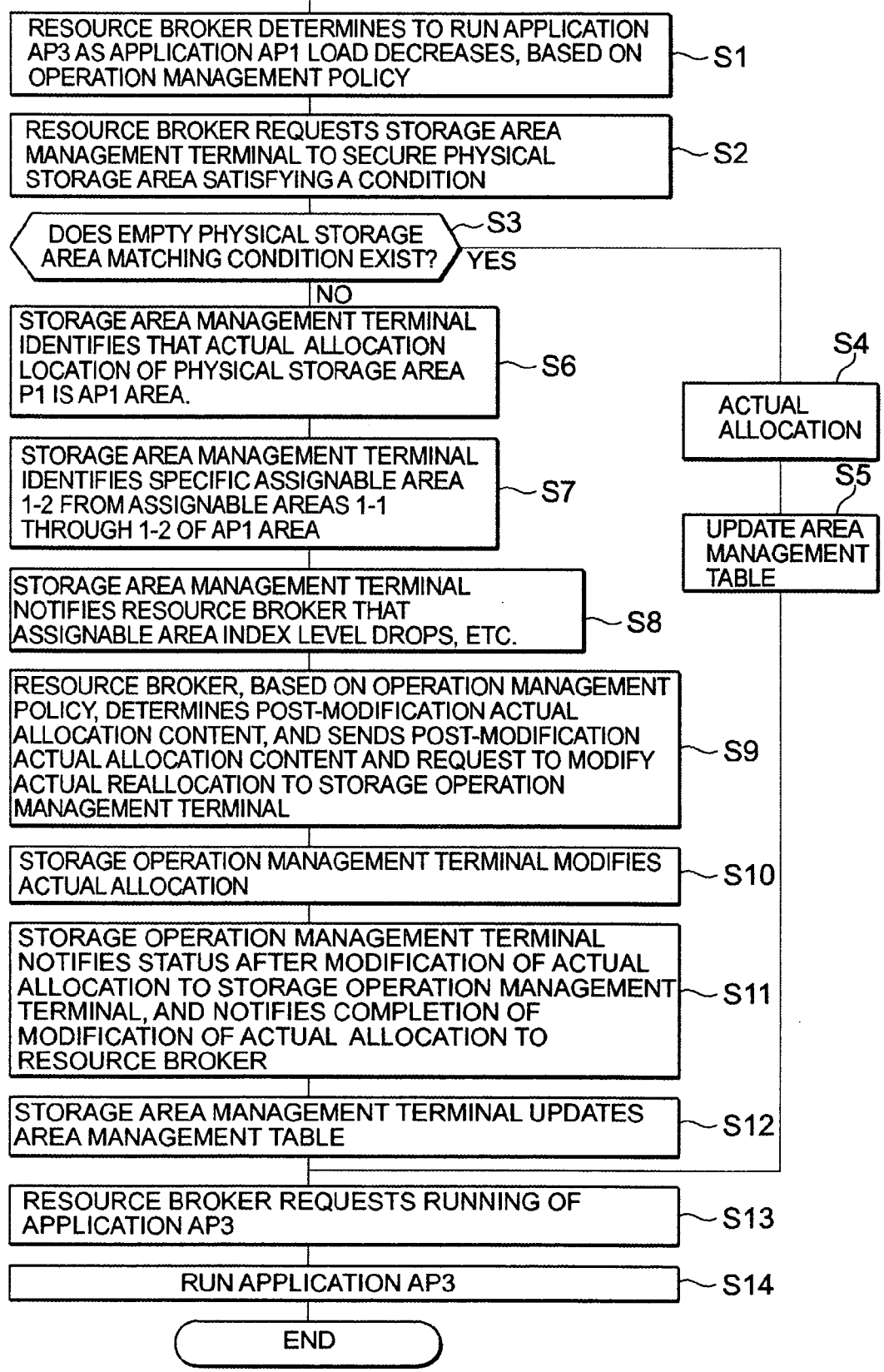
FIG. 4 shows a concrete example of a processing flow performed in an embodiment of the present invention.
Figure 5B:
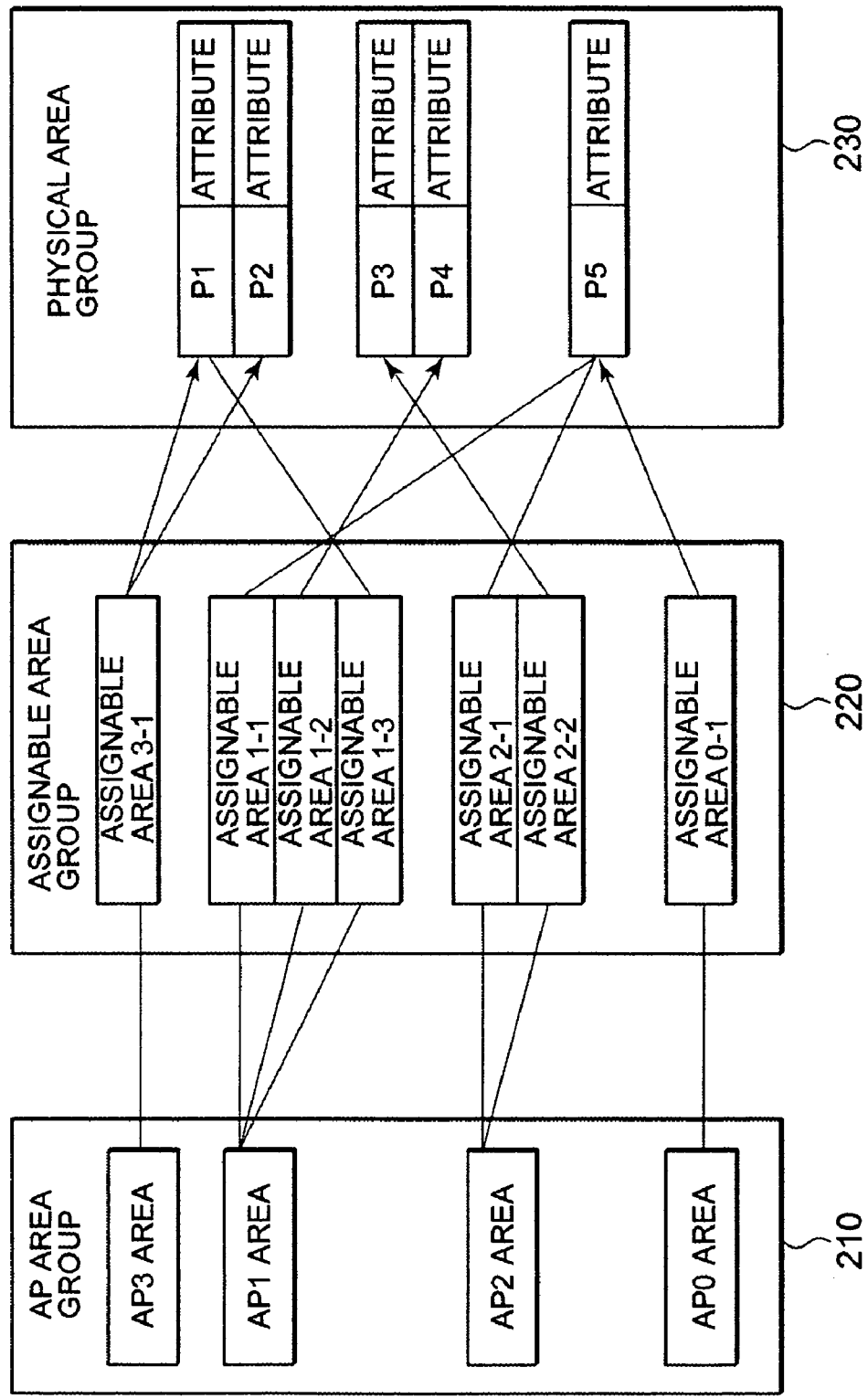
FIG. 5B shows a concept of the area management table 201 after starting the processing flow shown in FIG. 4.

FIG. 4 shows a concrete example of a processing flow performed in an embodiment of the present invention. FIG. 5A shows a concept of the area management table 201 before starting the processing flow, and FIG. 5B shows a concept of the area management table 201 after starting the processing flow. FIG. 6A shows a construction of the area management table 201 before starting the processing flow, and FIG. 6B shows a construction of the area management table 201 after starting the processing flow. FIGS. 7A and 7B show modification of actual allocation of physical storage areas to each AP area by means of the processing flow. Hereinafter, FIG. 4 through FIG. 6 are referenced to explain a specific example of processing flow performed in the present embodiment.

The resource broker 770 detects a given event, and performs operations of S1, which are described below. Specifically, for example, the resource broker 770 receives from the server operation management terminal 300 the operational status of the servers 20, 30 learned by the server operation management terminal 300, and based on the operational status, detects whether the load of the application program AP1 has decreased more than a given number of times previous, and then executes the operations of S1. Note that this event may be detected by either the server operation management terminal 300 or the resource broker 770. Furthermore, whether the application program load has decreased or increased is detected, for example, by storing the content of the operational status detected at each point in time as a history, and then comparing the stored history and the operational status detected the current time.

When the resource broker 770 detects that the load of the application program AP1 has decreased, if, for example, the operation management policy 771 states that when the application program AP1 load decreases an application program AP3 for executing a temporary given processing on the first server 20 using the application program AP1 is to be run, then the application program AP3 is run as indicated (S1).

The resource broker 770 makes a request to the storage area management terminal 200 to secure physical storage area satisfying a given condition (i.e., secure physical storage area to use for the application program AP3) (S2). Here, for example, as shown in FIG. 5 and FIG. 6, the "physical storage area satisfying a given condition" refers to the physical storage areas P1, P2 which are associated with the assignable area 3-1 for the application program AP3. Incidentally, in FIG. 5, for each AP area, thin lines indicate lines between physical storage areas that are simply the assignable candidates, and their associated assignable areas. Thick arrows indicated lines between actually assigned (i.e., actually allocated) physical storage areas, and their associated assignable areas.

The storage area management terminal 200 responds to the request from the resource broker 770 by referencing the area management table 201 and retrieving the physical storage area that satisfies the given condition (S3).

At S3, if, in contrast to the example shown in FIG. 5A and FIG. 6A, the physical storage areas P1, P2 are not actually allocated to any application program and therefore the physical storage areas P1, P2 matching the above-mentioned condition were able to be retrieved (Y at S3), then the storage area management terminal 200 request the storage operation management terminal 350 to assign the physical storage areas P1, P2 to the application program AP3. The storage operation management terminal 350 responds by controlling the storage system 700 to actually allocate the physical storage areas P1, P2 to the application program AP3 (S4). Specifically, for example, the storage operation management terminal 350 registers the access pathnames to the physical storage areas P1, P2 from the application program AP3, into the disk management table 4 (see FIG. 2). Furthermore, the storage area management terminal 200 updates the content of the area management table 201 (S5). For example, the storage area management terminal 200 updates the actual allocation information of the assignable area 3-1 in the area management table 201 from negative content to positive content. Furthermore, the resource broker 770 receives the notification of completion of the actual allocation from the storage operation management terminal 350 and the storage area management terminal 200, and instructs the server operation management terminal 300 to run the application program AP3. Accordingly, the server operation management terminal 300 runs the application program AP3.

On the other hand, at S3, if, as shown in FIG. 5A and FIG. 6A, at least one of the physical storage areas P1, P2 (specifically, P1) is actually allocated to the other application program AP1, and the physical storage areas P1, P2 matching the above-mentioned condition cannot be detected (N at S3), then the storage area management terminal 200 executes processing to reallocate the physical storage areas.

For example, the storage area management terminal 200 references the area management table 201, and identifies that the actual allocation destination of the physical storage area P1 is the AP1 area (that is, the application program using the physical storage area P1 is the application program AP1) (S6).

Next, the storage area management terminal 200 references the area management table 201, and from among the AP1 area's assignable areas 1-1 through 1-2, identifies the assignable area associated with an empty physical storage area that is not assigned to any application program at present (in the example shown in the diagram, P2 is also planned to be used by the application program AP3, so the assignable area 1-2 associated with P3 is used) (S7). In this case, the index of the identified assignable area 1-2 drops below that of the assignable area 1-3 which is actually allocated to the application program AP1.

Here, the storage area management terminal 200 notifies this fact to the resource broker 770 (S8). Furthermore, the storage area management terminal 200 may notify the area management table 201 itself or its access pathname to the resource broker 770, and the resource broker 770 may reference the area management table 201.

The resource broker 770 responds to the notification from the storage area management terminal 200 by referencing the operation management policy 771. When the operation management policy 771 has learned that the index can drop, or when the index is above the index minimum value (e.g., above "3") as a result of dropping, the following processing is performed. Namely, the resource broker 770, within the conditions written in the operation management policy 771, determines the post-modification actual allocation of the assignable areas with respect to the application programs AP0 through AP3, and sends the determined post-modification content and a request to modify the actual allocation according to that content, to the storage operation management terminal 350 (S9). Hereinafter, FIG. 5 is referenced and detailed description is given regarding an example of processing at S9.

For example, the resource broker 770 references the area management table 201, and determines to modify the assignable areas actually allocated to the AP1 area (i.e., the storage area used by the application program AP1) from 1-3 to 1-2. In other words, the resource broker 770 determines to modify the physical storage area where the AP1 is located from P1 to P4.

Furthermore, the resource broker 770 references the area management table 201 and determines to actually allocate the assignable area 3-1 to the AP3 area (i.e., the storage area used by the application program AP3). In other words, the resource broker 770 determines to actually allocate the physical storage areas P1, P2 to the AP1 area.

The resource broker 770 sends the determined content of the post-modification actual allocation and a request to modify the actual allocation according to this content, to the storage operation management terminal 350.

The storage operation management terminal 350 responds to the request received from the resource broker 770 by controlling the storage system 700 to execute processing to modify the actual allocation of the physical storage areas with respect to the application programs AP1, AP3 in accordance with the above-mentioned content received from the resource broker 770 (S10). Specifically, for example, the storage operation management terminal 350 registers into the disk management table 4 (see FIG. 2) the access pathname from the AP1, associating this with the post-modification physical storage area P4, and also registers the access pathname from the application program AP3 in association with the physical storage areas P1, P2. Furthermore, the storage operation management terminal 350 controls the storage system 700 to migrate the content in the physical storage area P1 to the physical storage area P4. As a result, as shown in FIGS. 7A, 7B, when the AP1 area exists, the physical storage area P1 changes to P4. As shown in FIG. 7C, the physical storage area P1 thus opened, and the physical storage area P2 which was already open, now exist at the AP3, which can be used by the newly run application program AP3.

When this processing to modify the actual allocation ends, the storage operation management terminal 350 notifies the post-modification actual allocation status (e.g., that the assignable area which was actually allocated for the application program AP1 was modified from 1-3 to 1-2, and that the assignable area 3-1 was actually allocated to the application program AP3) to the storage area management terminal 200, and notifies the completion of the modification of the actual allocation to the resource broker 770 (S11).

The storage area management terminal 200, based on the above-mentioned status notified from the storage operation management terminal 350, updates the content in the area management table 201, for example from the content shown in FIG. 6A to the content shown in FIG. 6B (S12).

The resource broker 770, when the notification of the completion of the actual allocation modification is received from the storage operation management terminal 350, requests the server operation management terminal 300 to run the application program AP3 (S13). The server operation management terminal 300 responds to the request by running the application program AP3 on the first server 20 (S14).

The foregoing was an example of processing flow for modifying the actual allocation of the assignable areas (i.e., the physical storage areas associated therewith) for each application program.

In the present embodiment, instead of simply migrating the AP areas from a first physical storage area to a second physical storage area (or again from the second physical storage area to a third physical storage area), it is also possible, at predetermined or freely selected timing (e.g., when an application program shuts down) to return the once-migrated AP area from the physical storage area that was the migration destination back to the original first physical storage area. Hereinafter, explanation is given regarding an example thereof.

Figure 8:
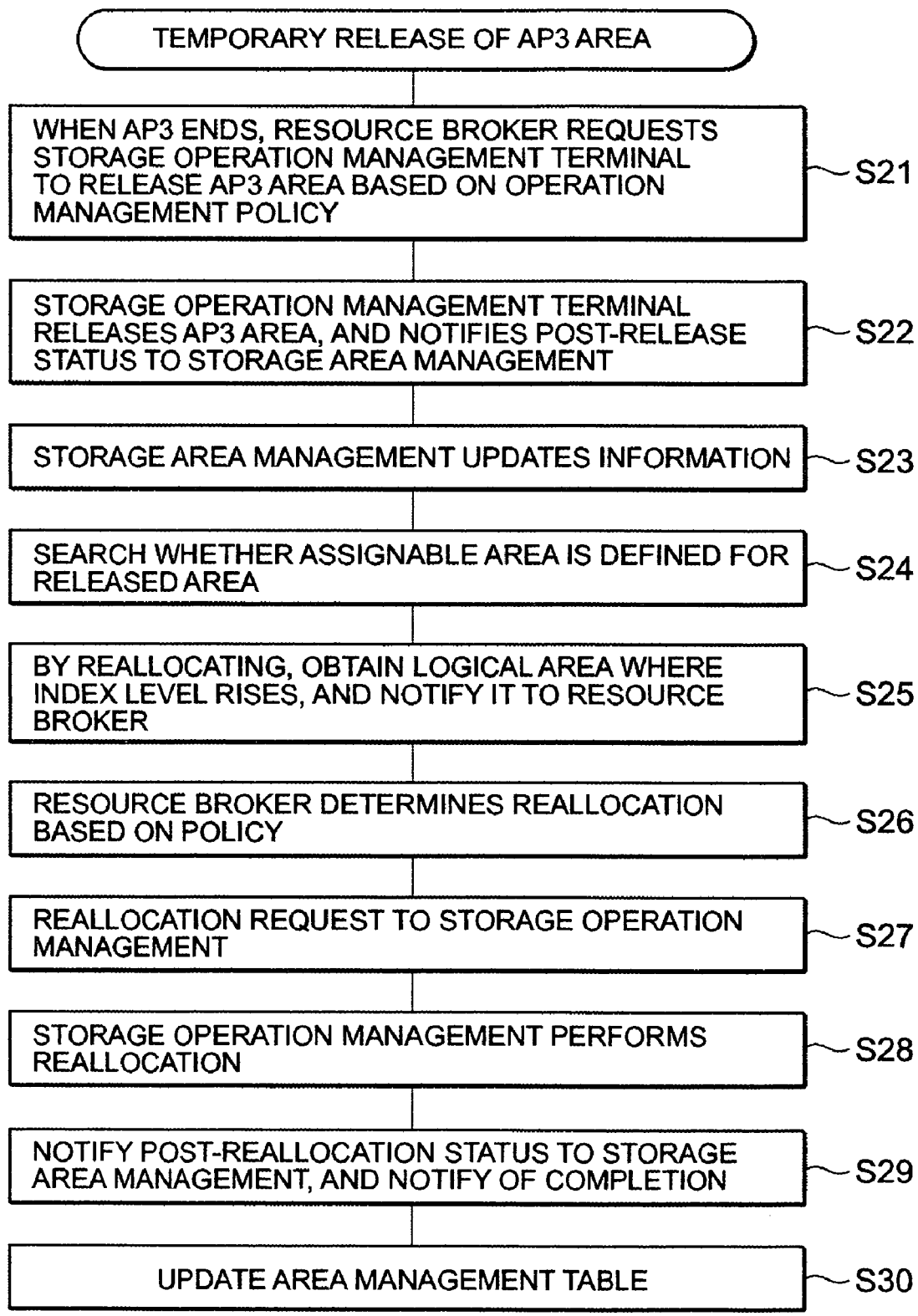
FIG. 8 shows an example of processing flow performed when a physical storage area P1 that was actually allocated to an application program AP3, is then actually allocated to an application program AP1.

FIG. 8 shows an example of processing flow performed when the physical storage area P1 that was actually allocated to the application program AP3 is then actually allocated to the application program AP1. FIG. 9 shows modification of the actual allocation of physical storage areas to each AP area by means this processing flow.

The resource broker 770, based on the operational status notified from the server operation management terminal 300, detects the completion of the application program AP3.

If the operation management policy 771 states that after the completion of the application program AP3 the AP3 area is to be released (i.e., the physical storage areas P1, P2 that were actually allocated to the application program AP3 are to be released), then the resource broker 770 requests the storage operation management terminal 350 to release the AP3 area (S21).

The storage operation management terminal 350 responds to the request by controlling the storage system 700 to release the AP3 area, and notifies the post-release status (e.g., that the assignable area 3-1 is no longer actually allocated, and that the physical storage areas P1, P2 have opened up) to the storage area management terminal 200 (S22).

The storage area management terminal 200 then updates the content in the area management table 201 based on the above-mentioned status notified from the storage operation management terminal 350 (S23). For example, the storage area management terminal 200 updates the actual allocation information associated with the identifier of the assignable area 3-1 from the positive content to negative content.

The storage area management terminal 200 retrieves another assignable area that is associated with the physical storage areas P1, P2 associated with the assignable area 3-1 that was released (i.e., actual allocation information was modified from the positive content to the negative content) (S24). In the present embodiment, no other assignable area is retrieved for the physical storage area P2, but another assignable area 1-3 is retrieved for the physical storage area P1.

The index of the retrieved assignable area 1-3 is higher than the index of the assignable area 1-2 that is actually allocated to the associated application program AP1. The storage area management terminal 200 references the area management table 201 to obtain various information (e.g., the assignable area 1-3 whose index has risen higher than the assignable area 1-2, the index thereof, and information indicating that the associated AP area is the AP1 area, and that the physical storage area P1 is associated with the assignable area 1-3), and notifies the obtained information to the resource broker 770 (S25).

The resource broker 770 receives the information from the storage area management terminal 200, and references the operation management policy 771. If the resource broker 770 detects that the content of the received information (i.e., that the AP1 area has actually been allocated the assignable area 1-3 with the higher index) does not violate the operation management policy 771, then the resource broker 770 determines to actually allocate the assignable area 1-3 to the AP1 (S26). The resource broker 770 sends the determined real-location content and a request to actually allocated according to that content, to the storage operation management terminal 350 (S27).

The storage operation management terminal 350 responds to the request received from the resource broker 770 by controlling the storage system 700 to execute processing to actually allocated the physical storage area P1 to the application program AP1, in accordance with the above-mentioned content received from the resource broker 770 (S28). Specifically, for example, the storage operation management terminal 350 registers the access pathname from the application program AP1, in association with the physical storage area P1, in the disk management table 4 (see FIG. 2) Furthermore, the storage operation management terminal 350 controls the storage system 700 to migrate the data in the physical storage area P4 to the physical storage area P1.

As a result, as shown in FIGS. 9A through 9C, if the AP1 region exists, it returns from the physical storage area P1 to the physical storage area P1.

The storage operation management terminal 350, when the processing to perform the actual allocation as described above ends, notifies the post-actual allocation status (e.g., that the assignable area that was actually allocated to the application program AP1 was modified from 1-2 to 1-3) to the storage area management terminal 200, and notifies the resource broker 770 that the actual allocation processing has ended (S29).

The storage area management terminal 200, based on the above-mentioned status notifies from the storage operation management terminal 350, updates the content in the area management table 201 from, for example, the content shown in FIG. 6B to the content shown in FIG. 6A (S30).

As described above, according to the above-mentioned embodiment, for each application program one or a plurality of assignable areas is prepared, and one or a plurality of physical storage areas is associated with each assignable area. In other words, one or more physical storage area candidates that can be actually allocated to each application program, are selected before hand, from among the plurality of physical storage areas present within the storage system 700, and are associated with the selected physical storage area candidates. When modifying the actual allocation of the physical storage areas to the application programs, the physical storage areas actually allocated to each application program are not retrieved from among all the physical storage areas, but rather are retrieved from the one or more physical storage area candidates that have been selected beforehand as mentioned above. This can reduce the processing load of modifying the actual allocation of the physical storage areas.

Figure 10A:
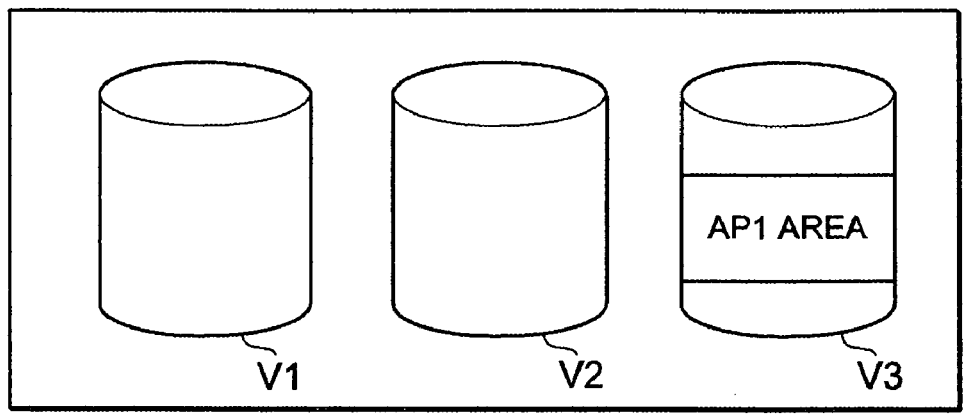
FIG. 10 shows an example of other processing performed in an embodiment of the present invention.
Figure 10B:
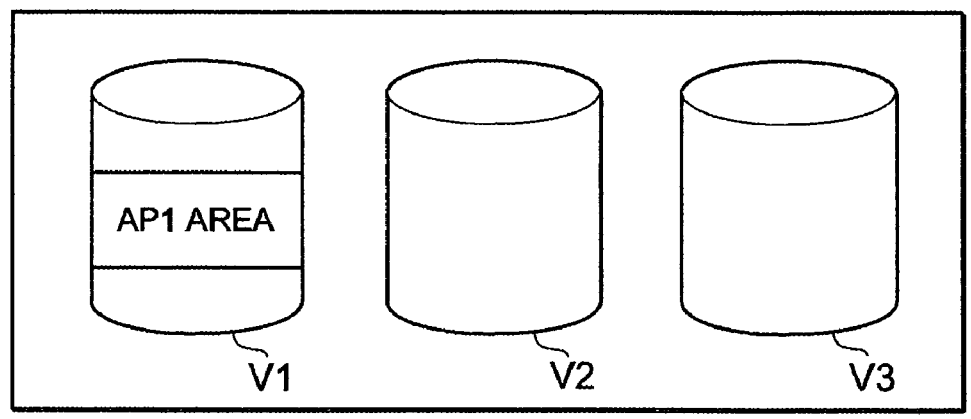
Figure 10C:
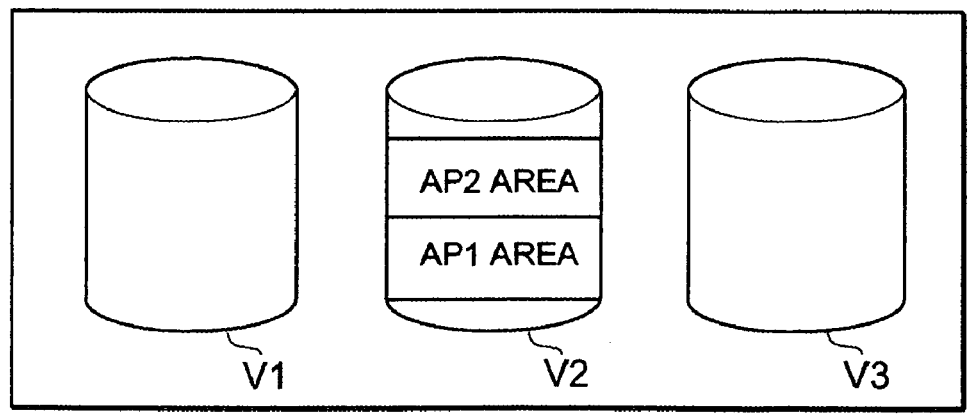

Furthermore, according to the embodiment mentioned above, each assignable area is assigned an index for determining whether or not to actually allocated that assignable area, and the operation management policy 771 stating a policy for modifying the actual allocation based on the indices is prepared. The modification of the actual allocation is performed based on each of the indices and the operation management policy 771. Therefore, based on what type of index is set for which assignable area for which application program, and based on what kind of content is in the operation management policy 771, it is possible to perform the modification of the actual allocation in line with the objectives of the user. Specifically, as shown in the example in FIG. 10, planned operations can be achieved.

Namely, for example, in the operation management policy 771, as the condition for the application program AP1, it may be recorded that, preferably, during a normal timeframe when the load is considered to be mid-level (e.g., from just past 8:00 am until 9:00 pm) the assignable areas with an index of "2" or greater are actually allocated, and during a slow timeframe when the load is low-level (e.g., from just past 9:00 pm until 8:00 am) the assignable areas with an index of "3" are actually allocated, and when the load is high-level the assignable area with an index of "1" are actually allocated.

Accordingly, by performing the processing flow explained above, the actual allocation processing is performed in accordance with the content in the operation management policy 771. Specifically, during the normal timeframe the assignable areas 1-1 or 1-3 with the index of "2" or greater are actually allocated to the AP1 area, and during the slow timeframe the assignable area 1-3 with the index "3" is actually allocated to the AP1 area. Then, during both the normal timeframe and the slow timeframe, if the application program AP1 load becomes high-level, then the assignable area 1-1 with the index "1" is prioritized and actually allocated to the AP1 region. Note that, during the slow timeframe, not only the assignable area 1-3 with the index "3", but also, for example, if the physical storage areas associated with the assignable areas 1-1 or 1-3 with indices of "1" or "2" are open, then those assignable areas 1-1 or 1-3 may also be assigned to the AP1 area.

Furthermore, according to the above-mentioned embodiment, not only do the AP areas migrate simply from the first physical storage area to the second physical storage area (or, again, from the second physical storage area to the third physical storage area), but also, at predetermined or freely chosen timing, the once-migrated AP areas sometimes return from the migration destination physical storage area back to the first physical storage area. Accordingly, this can prevent a problem of not being able to learn where which AP area is. In other words, according to the above-mentioned embodiment, for each application program a range of assignable physical storage areas is determined. Therefore, the migration range of each AP area is limited, and therefore, the problem of not knowing which AP area has been assigned which physical storage area is prevented.

The foregoing explained a preferable embodiment of the present invention. However, this embodiment was an illustrative example for explaining the present invention, and is not intended to restrict the scope of the present invention to this embodiment. The present invention can be reduced to practice in various other embodiments as well.

For example, the quantity of the servers 20 or 30 is not limited to two, but may also be one or three. Furthermore, the quantity of the storage system 700 is not limited to one, but may be plural in number. In the case where a plurality of the storage systems 700 are provided, for example, the storage area management terminal 200 may manage physical area information or the like for each of the plurality of storage systems 700.

Furthermore, for example, at least two of the following may be provided inside a single computer: the computer program operating as the server operation management terminal 300, the computer program operating as the resource broker 770, the computer program operating as the storage operation management terminal 350, and the computer program operating as the storage area management terminal 200. Specifically, for example, the resource broker 770 and the storage area management terminal 200 may be realized on a single machine. In such a case, for example, when the machine determines to run the application program AP3, based on the operation management policy 771 and the area management table 201, and within the content written in the operation management policy 771, the machine may determine the content of the modification to the actual allocation and send the determined content and the like to the storage operation management terminal 350.

Furthermore, for example, the range of the indices is not limited to 1 though 3, but rather a wider or narrower range may be used. Furthermore, the indices may be set for the physical storage areas, either instead of or in addition to the assignable areas.

Furthermore, for example, in the above-mentioned embodiment, the operational status of the servers was mainly the status of the application programs, but the present invention is not restricted to this embodiment. It is also possible to use the status of the server itself and other conditions. Furthermore, the application program, for example, may be a virtual computer generated or deleted dynamically within the server 20 or 30.

Furthermore, for example, at least one of the resource broker 770 and the storage area management terminal 200 may store a history of updates made in the area management table 201 (such as the content of the immediately previous area management table 201). In such a case, for example, at least one of the resource broker 770 and the storage area management terminal 200 may use this history to return the actual allocation of the assignable areas to the application programs AP, back to their immediately previous status.

What is claimed is:

1. A storage area management system provided to a computer system having a plurality of storage areas and a plurality of application programs using one or more of the storage areas as a resource, the storage area management system comprising:
   a management data obtaining unit for obtaining area management data in which one or more storage area IDs identifying one or more storage area candidates among the plurality of storage areas is associated with each application program;
   a policy data obtaining unit for obtaining selection policy data stating a guideline for storage area assignments based on operational status of the application programs;
   an operational status detecting unit for detecting operational status of each of the plurality of application programs;
   an area assignment determining unit for using the detected operational status of each of the plurality of application programs and the obtained selection policy data to refer the obtained area management data, and searching through the one or more storage area IDs associated with each application program to extract from the one or more storage area IDs one storage area ID of the storage area to assign to each application program, so that the storage areas to assign to the application programs are changed in accordance with the operational statuses of the application programs; and
   an assignment information output unit for outputting assignment information about which application program to assign which storage area, based on the storage area ID extracted for each application program;
   wherein, in the area management data, one or a plurality of assignable areas are prepared for each application program;
   each assignable area of each application program is associated with one or a plurality of the storage area IDs, and an index indicating a level selected from a plurality of levels;
   the selection policy data records a plurality of index levels associated with a plurality of operational statuses of the application programs; and
   the area assignment determining unit, for each application program, extracts from the obtained selection policy data an index associated with the detected operational status for said each application program, references the area management data, searches for and retrieves an assignable area associated with the extracted index and said each application program, and extracts a storage area ID from the one or plurality of storage area IDs associated with the retrieved assignable area.

2. The storage area management system according to claim 1, wherein the computer system is provided with one or more storage systems having a plurality of physical or logical storage devices;
   the storage area associated with the extracted storage area ID is one or a plurality of storage areas provided inside the plurality of physical or logical storage devices;
   the one or more storage systems are provided with a first storage device having a first storage area, and a second storage device having a second and a third storage area;
   the plurality of application programs include a first and a second application program;
   the area management data records currently-assigned area information for identifying assignable areas which are currently assigned to the first and second application programs respectively;
   the area management data has a first and a second assignable area associated with the first application program, and a third assignable area associated with the second application program;
   the first assignable area is associated with a first storage area ID which is a storage area ID of the first storage area, and a first index;
   the second assignable area is associated with a second storage area ID which is a storage area ID of the second storage area, and a second index at a lower level than the first index;
   the third assignable area is associated with the first storage area ID and a third index at a higher level than the first index; and
   the area assignment determining unit:
      detects, based on the currently-assigned area information associated with the first application program, that the first assignable area is currently assigned;
      detects that the third index of the third assignable area associated with the second application program indicates a higher-level than the first index of the first assignable area which is currently assigned;
      modifies the assignable area currently assigned to the first application program from the first assignable area to the second assignable area based on the selection policy data;
      extracts the first storage area ID associated with third assignable area from the area management data as a storage area ID to be assigned to the second application program; and
      updates the currently-assigned area information for the second application program to information indicating that the third assignable area is currently assigned.

3. The storage area management system according to claim 2, wherein the area assignment determining unit:
   updates the currently-assigned area information for the second application program to information indicating that the third assignable area is not currently assigned;
   retrieves, from the area management data, the first assignable area associated with the first storage area ID associated with third assignable area; and
   updates the currently-assigned area information for the first application program to information to indicate that the retrieved first assignable area is currently assigned.

4. The storage area management system according to claim 1, wherein the area assignment determining unit detects the completion of an application program among the plurality of application programs based on the detected operational status, releases a storage area among the plurality of storage areas which is assigned to the completed application program, searches through storage area IDs including a storage ID in connected with the released storage area, and extracts a storage area ID to assign to each application program excepting the completion application program.

5. The storage area management system according to claim 1, wherein the storage area associated with the extracted storage area ID is a physical storage area on a storage device.

6. The storage area management system according to claim 1, wherein the storage areas are present in a storage system, and the application programs are present in a server connected to the storage system.

7. A storage area management method realized on a computer system having a plurality of storage areas and a plurality of application programs using one or more of the storage areas as a resource, the storage area management method comprising:
   a management data obtaining step of obtaining area management data in which one or more storage area IDs for identifying one or more storage area candidates selected among the plurality of storage areas is associated with each application program;
   a policy data obtaining step of obtaining selection policy data stating a guideline for storage area assignments based on operational status of the application programs;
   an operational status detecting step of detecting operational status of each of the plurality of application programs;
   an area assignment determining step of using the detected operational status of each of the plurality of application programs and the obtained selection policy data to refer the obtained area management data, and searching through the one or more storage area IDs associated with each application program to extract from the one or more storage area IDs one storage area ID of a storage area to be assigned to each application program, so that the storage areas to assign to the application programs are changed in accordance with the operational statuses of the application programs;
   an assignment information outputting step of outputting assignment information about which application program to assign which storage area, based on the storage area ID extracted for each application program; and
   an area assigning step of inputting the outputted assignment information, and assigning the storage areas to the application programs based on the assignment information;
   wherein, in the area management data, one or a plurality of assignable areas are prepared for each application program;
   each assignable area of each application program is associated with one or a plurality of the storage area IDs, and an index indicating a level selected from a plurality of levels;
   the selection policy data records a plurality of index levels associated with a plurality of operational statuses of the application programs; and
   the area assignment determining step, for each application program, extracts from the obtained selection policy data an index associated with the detected operational status for said each application program, references the area management data, searches for and retrieves an assignable area associated with the extracted index and said each application program, and extracts a storage area ID from the one or plurality of storage area IDs associated with the retrieved assignable area.

8. The storage area management method according to claim 7, wherein:
   the computer system is provided with one or more storage systems having a plurality of physical or logical storage devices;
   the storage area associated with the extracted storage area ID is one or a plurality of storage areas provided inside the storage device;
   the one or more storage systems are provided with a first storage device having a first storage area, and a second storage device having a second and a third storage area;
   the plurality of application programs include a first and a second application program;
   the area management data records currently-assigned area information for identifying assignable areas which are currently assigned to the first and second application programs respectively;
   the area management data has a first and a second assignable area associated with the first application program, and a third assignable area associated with the second application program;
   the first assignable area is associated with a first storage area ID which is a storage area ID of the first storage area, and a first index;
   the second assignable area is associated with a second storage area ID which is a storage area ID of the second storage area, and a second index at a lower level than the first index;
   the third assignable area is associated with the first storage area ID and a third index at a higher level than the first index;
   the area assignment determining step:
      detects, based on the currently-assigned area information associated with the first application program, that the first assignable area is currently assigned;
      detects that the third index of the third assignable area associated with the second application program indicates a higher-level than the first index of the first assignable area which is currently assigned;
      modifies the assignable area currently assigned to the first application program from the first assignable area to the second assignable area, based on the selection policy data;
      extracts the first storage area ID associated with third assignable area, from the area management data, as a storage area ID to be assigned to the second application program; and
      updates the currently-assigned area information for the second application program to information indicating that the third assignable area is currently assigned;
   the information outputting step outputs assignment information indicating that the area used by the first application program is to be modified from the first storage area to the second storage area, and that the first storage area is to be assigned as the area to be used by the second application program; and
   the area assigning step, based on the outputted assignment information, modifies the area used by the first application program from the first storage area to the second storage area, and assigns the first storage area as the area to be used by the second application program.

9. The storage area management method according to claim 7, wherein the area assignment determining step:
   updates the currently-assigned area information for the second application program to information indicating that the third assignable area is not currently assigned;

retrieves, from the area management data, the first assignable area associated with the first storage area ID associated with third assignable area; and updates the currently-assigned area information for the first application program, to information indicating that the retrieved first assignable area is currently assigned.

10. The storage area management method according to claim 7, wherein the area assignment determining unit detects the completion of an application program among the plurality of application programs based on the detected operational status, releases a storage area among the plurality of storage areas which is assigned to the completed application program, searches through storage area IDs including a storage ID in connected with the released storage area, and extracts a storage area ID to assign to each application program excepting the completion application program.

11. The storage area management method according to claim 7, wherein the storage area associated with the extracted storage area ID is a physical storage area on a storage device.

* * * * *